United States Patent
Yoshida et al.

(10) Patent No.: US 12,384,927 B2
(45) Date of Patent: Aug. 12, 2025

(54) RADIATION-CURABLE INK JET INK COMPOSITION AND INK JET PRINTING METHOD

(71) Applicant: SEIKO EPSON CORPORATION, Tokyo (JP)

(72) Inventors: Yoshinobu Yoshida, Shiojiri (JP); Kyohei Tanaka, Sagamihara (JP); Midori Sekine, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 289 days.

(21) Appl. No.: 17/993,042

(22) Filed: Nov. 23, 2022

(65) Prior Publication Data

US 2023/0167314 A1    Jun. 1, 2023

(30) Foreign Application Priority Data

Nov. 26, 2021   (JP) .................................. 2021-192105

(51) Int. Cl.
   *C09D 11/107*    (2014.01)
   *B41J 2/01*      (2006.01)
   (Continued)

(52) U.S. Cl.
   CPC ............... *C09D 11/107* (2013.01); *B41J 2/01* (2013.01); *B41J 2/2107* (2013.01); *B41M 5/00* (2013.01);
   (Continued)

(58) Field of Classification Search
   CPC ......... C09D 11/36; C09D 11/40; C09D 11/30; C09D 11/38; C09D 11/32; C09D 11/322;
   (Continued)

(56) References Cited

U.S. PATENT DOCUMENTS

| | | | |
|---|---|---|---|
| 2015/0017398 A1* | 1/2015 | Saito | C09D 11/107 347/102 |
| 2015/0077481 A1* | 3/2015 | Yoshino | C09D 11/101 106/31.13 |

(Continued)

FOREIGN PATENT DOCUMENTS

| | | |
|---|---|---|
| CN | 113444397 A | 9/2021 |
| JP | 2012-188612 A | 10/2012 |
| JP | 2017-115105 A | 6/2017 |

*Primary Examiner* — Manish S Shah
(74) *Attorney, Agent, or Firm* — Harness, Dickey & Pierce, P.L.C.

(57) ABSTRACT

A radiation-curable ink jet ink composition contains polymerizable monomers A including at least one monofunctional monomer B and at least one multifunctional monomer C. The polymerizable monomers A include at least one polymerizable monomer A1 whose homopolymer has a glass transition temperature of 50° C. or more in a proportion of 20% by mass or more relative to the total mass of the polymerizable monomers A. Homopolymers of the polymerizable monomers A have glass transition temperatures whose average weighted by the proportions by mass of the individual polymerizable monomers A is 25° C. to 40° C. The amount of at least one monofunctional monomer B is 50% to 80% by mass relative to the total mass of the polymerizable monomers A. The at least one multifunctional monomer C includes a specific vinyl group-containing (meth)acrylate C1.

7 Claims, 1 Drawing Sheet

(51) Int. Cl.
  *B41J 2/21*      (2006.01)
  *B41M 5/00*      (2006.01)
  *B41M 7/00*      (2006.01)
  *C09D 11/101*    (2014.01)
  *C09D 11/30*     (2014.01)
  *C09D 11/322*    (2014.01)

(52) U.S. Cl.
  CPC ........ *B41M 5/0023* (2013.01); *B41M 5/0047* (2013.01); *B41M 7/0081* (2013.01); *C09D 11/101* (2013.01); *C09D 11/30* (2013.01); *C09D 11/322* (2013.01)

(58) Field of Classification Search
  CPC ... C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | | |
|---|---|---|---|
| 2015/0232675 A1* | 8/2015 | Yoshino | C09D 11/324 106/31.13 |
| 2016/0009931 A1* | 1/2016 | Kohzuki | C09D 175/08 347/86 |
| 2016/0326387 A1* | 11/2016 | Arita | C09D 11/30 |
| 2017/0260405 A1* | 9/2017 | Kumai | C09D 11/102 |
| 2018/0002552 A1* | 1/2018 | Nakano | C09D 11/30 |
| 2018/0257387 A1 | 9/2018 | Nakano et al. | |
| 2019/0062580 A1* | 2/2019 | Nakashima | C09D 11/107 |
| 2021/0301158 A1 | 9/2021 | Koike et al. | |
| 2021/0301162 A1* | 9/2021 | Nakamura | C09D 11/38 |
| 2022/0220326 A1* | 7/2022 | Tanaka | C09D 11/101 |

* cited by examiner

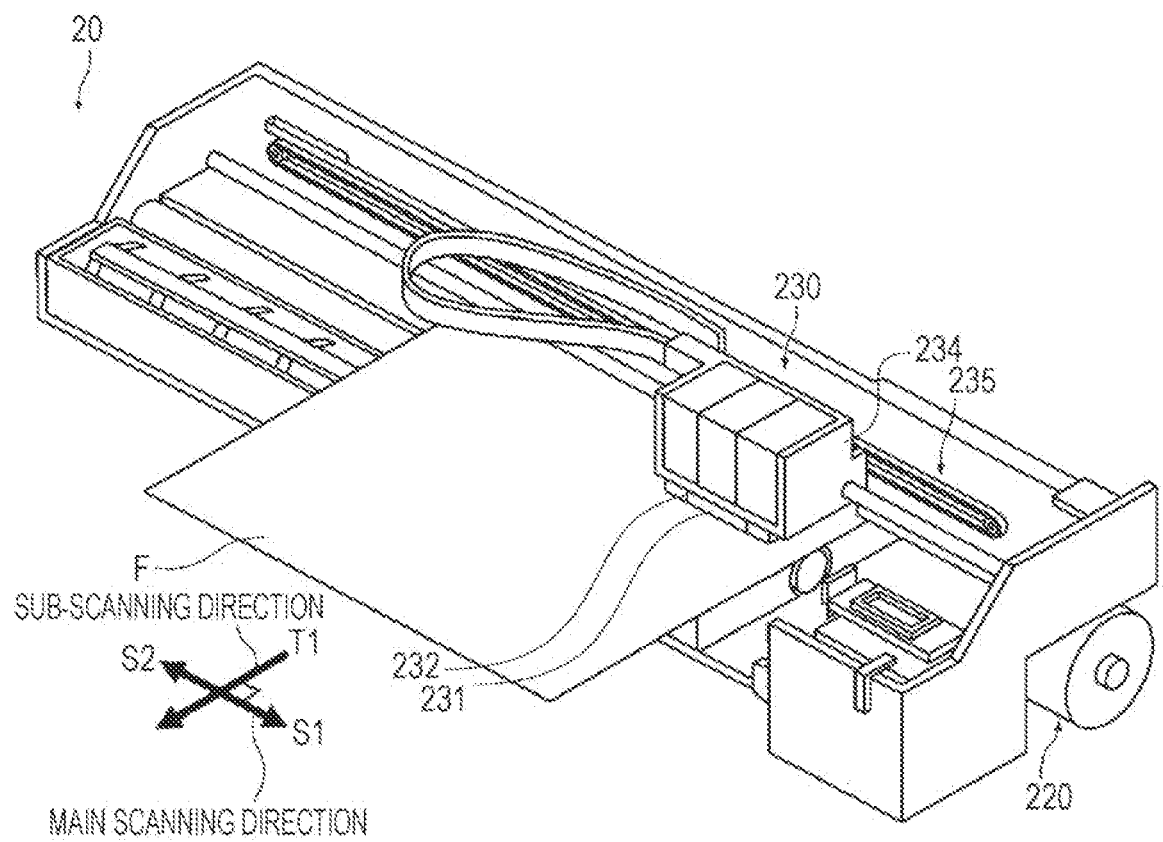

RADIATION-CURABLE INK JET INK COMPOSITION AND INK JET PRINTING METHOD

The present application is based on, and claims priority from JP Application Serial Number 2021-192105, filed Nov. 26, 2021, the disclosure of which is hereby incorporated by reference herein in its entirety.

BACKGROUND

1. Technical Field

The present disclosure relates to a radiation-curable ink jet ink composition and an ink jet printing method.

2. Related Art

Ink jet printing methods, which enable high-definition image printing with a relatively simple apparatus, have been rapidly developed in various fields. In particular, many photo-curable ink jet ink compositions and ink jet printing methods using the photo-curable ink jet ink compositions have been devised. For example, JP-A-2017-115105 discloses an active energy ray-curable ink containing polymerizable compounds, a pigment, and a fluorosurfactant in predetermined proportions for the purpose of providing an active energy ray-curable ink that can form an additive-manufactured cured object with high extensibility and high color density by ink jet image formation.

Unfortunately, the ink disclosed in the above-cited JP-A-2017-115105 contains 85% by mass or more of monofunctional monomers relative to the total mass of the polymerizable compounds. Inks containing monofunctional monomers in such a high proportion form highly adhesive ink coatings, but the ink coatings being cured are soft and prone to cause blocking. However, when the monofunctional monomer content is reduced, the proportion of multifunctional monomers, which are relatively viscous, increases, and the ink is prone to have an increased viscosity. Additionally, the adhesion of the ink coatings is prone to decrease, and the ink coatings tend to be less resistant to rubbing.

SUMMARY

According to an aspect of the present disclosure, a radiation-curable ink jet ink composition is provided. The radiation-curable ink jet ink composition contains polymerizable monomers A including at least one monofunctional monomer B and at least one multifunctional monomer C. The polymerizable monomers A include at least one polymerizable monomer A1 whose homopolymer has a glass transition temperature of 50° C. or more in a proportion of 20% by mass or more relative to the total mass of the polymerizable monomers. The homopolymers of the polymerizable monomers A have glass transition temperatures whose average weighted by the proportions by mass of the individual polymerizable monomers A is 25° C. to 40° C. The amount of the at least one monofunctional monomer B is 50% by mass to 80% by mass relative to the total mass of the polymerizable monomers A. The at least one multifunctional monomer C includes vinyl-containing (meth)acrylate C1 represented by the following general formula (I):

$$H_2C=CR^1—CO—OR^2—O—CH=CH—R^3 \quad (I)$$

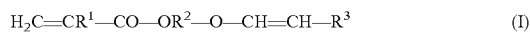

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

The present disclosure is also directed to an ink jet printing method including an ink application step of ejecting the above-described radiation-curable ink jet ink composition onto a printing medium from an ink jet head, and an irradiation step of irradiating the radiation-curable ink jet ink composition on the printing medium with radiation.

BRIEF DESCRIPTION OF THE DRAWING

The FIGURE is a schematic perspective view of a printing apparatus that can be used in an embodiment of the present disclosure.

DESCRIPTION OF EXEMPLARY EMBODIMENTS

Some embodiments of the present disclosure will now be described in detail with reference to the drawing as needed. However, the implementation of the concept of the disclosure is not limited to the embodiments disclosed herein, and various modifications may be made without departing from the scope and spirit of the disclosure. The same elements in the drawings are designated by the same reference numerals, and thus description thereof is omitted. The vertical, lateral, and other positional relationships are in accordance with the drawing unless otherwise specified. The dimensional proportions in the drawing are not limited to those illustrated in the drawing.

In the description disclosed herein, "(meth)acryloyl" refers to at least either acryloyl or methacryloyl; "(meth)acrylate" refers to at least either an acrylate or the corresponding methacrylate; and a "(meth)acrylic" compound refers to at least either an acrylic compound or the corresponding methacrylic compound.

1. Radiation-Curable Ink Jet Ink Composition

The radiation-curable ink jet ink composition (hereinafter also simply referred to as the ink composition) contains polymerizable monomers A including one or more monofunctional monomers B and one or more multifunctional monomers C. The polymerizable monomers A include at least one polymerizable monomer A1 whose homopolymer has a glass transition temperature of 50° C. or more in a proportion of 20% by mass or more relative to the total mass of the polymerizable monomers A. The homopolymers of the polymerizable monomers A have glass transition temperatures whose average weighted by the proportions by mass of the individual polymerizable monomers A is 25° C. to 40° C. The amount of the monofunctional monomers B is 50% by mass to 80% by mass relative to the total mass of the polymerizable monomers A. The multifunctional monomers C include vinyl-containing (meth)acrylate C1 represented by the following general formula (I):

$$H_2C=CR^1—CO—OR^2—O—CH=CH—R^3 \quad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

In the embodiments of the present disclosure, the radiation-curable ink jet ink composition refers to an ink jet ink composition that is cured by irradiation with radiation. The radiation may be ultraviolet light, an electron beam, infrared light, visible light, or X rays. In some embodiments, UV light is used as the radiation because of the prevalence and availability of the radiation source and the materials suitable for curing with UV light.

An ink jet ink composition refers to an ink composition used in such a manner as to be ejected onto a printing medium from an ink jet head.

In order to improve the adhesion of the ink coating to printing media, studies have been conducted to increase the proportion of monofunctional monomers to polymerizable monomers. However, when prints are produced using such an ink composition, which contains monofunctional monomers in a high proportion, the ink coating is likely to be soft and prone to cause blocking.

In contrast, the ink composition disclosed herein contains a relatively reduced amount of monofunctional monomers B and a relatively increased amount of multifunctional monomers C compared to known ink compositions, thereby improving the anti-blocking property of the ink coating. Additionally, the adhesion and resistance to rubbing (hereinafter referred to as rub resistance) of the ink coating are ensured by using at least one polymerizable monomer A1 whose homopolymer has a specific glass transition temperature, and controlling the weighted average glass transition temperature of the homopolymers of the polymerizable monomers A.

Furthermore, the ink composition disclosed herein uses multifunctional monomer C1 having a specific structure to reduce the likelihood that the use of a relatively large amount of multifunctional monomers C increases the viscosity of the ink composition.

The constituents, physical properties, and preparation method of the radiation-curable ink jet ink composition disclosed herein will now be described.

1.1. Polymerizable Monomers A

In the description of the present disclosure, monomers with polymerizable unsaturated bonds are collectively referred to as polymerizable monomers A. When the polymerizable monomers A used herein are defined in terms of the number of polymerizable functional groups, each polymerizable monomer A is either a monofunctional monomer B with one polymerizable functional group or a multifunctional monomer C with a plurality of polymerizable functional groups.

When the polymerizable monomers A are defined in terms of the glass transition temperature of the homopolymer, each polymerizable monomer A may be a polymerizable monomer A1 whose homopolymer has a glass transition temperature of 50° C. or more, a polymerizable monomer A2 whose homopolymer has a glass transition temperature of less than −20° C., or a polymerizable monomer A3 whose homopolymer has a glass transition temperature of −20° C. to less than 30° C. In other words, all the polymerizable monomers A belong to one or two or more of the monomer groups: monofunctional monomers B, multifunctional monomers C, polymerizable monomers A1, polymerizable monomers A2, and polymerizable monomers A3.

For the polymerizable monomers A, the following description will describe first the monofunctional monomers B and the multifunctional monomers C in detail in view of the number of polymerizable functional groups, and then the polymerizable monomers A1, A2, and A3 in view of the glass transition temperature of the homopolymer.

1.1.1. Definition by Number of Polymerizable Functional Groups

The polymerizable monomers A used herein include one or more monofunctional monomers B and one or more multifunctional monomers C. The monofunctional monomers B and the multifunctional monomers C will be described in this order.

1.1.1.1. Monofunctional Monomers B

The lower limit of the amount of monofunctional monomers B is 50% by mass relative to the total mass of the polymerizable monomers A and may be 52.5% by mass, for example, 55% by mass or 57.5% by mass. Monofunctional monomers B in a proportion of 50% by mass or more increases the adhesion of the ink coating. The upper limit of the amount of monofunctional monomers B is 80% by mass relative to the total mass of the polymerizable monomers A and may be 75% by mass, for example, 72.5% by mass or 70% by mass. Monofunctional monomers B in a proportion of 80% by mass or less improves the anti-blocking property.

Examples of the monofunctional monomers B include, but are not limited to, nitrogen-containing monofunctional monomers, aromatic group-containing monofunctional monomers, saturated aliphatic group-containing monofunctional monomers, and monofunctional (meth)acrylates with a crosslinked condensed ring structure. Optionally, one or more of such monofunctional monomers B may be replaced with other monofunctional monomers, or the monofunctional monomers B may include other monofunctional monomers. Such a monofunctional monomer may be, but is not limited to, a known monofunctional monomer having a polymerizable functional group, particularly a polymerizable functional group with a carbon-carbon unsaturated double bond. The following are examples of monofunctional monomers, but the monofunctional monomers used in the embodiments of the present disclosure are not limited to the following examples.

Examples of nitrogen-containing monofunctional monomers include, but are not limited to, nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional (meth)acrylamide monomers, such as (meth)acrylamide, N-(hydroxymethyl)(meth)acrylamide, diacetone acrylamide, N,N-dimethyl(meth)acrylamide, and dimethylaminoethyl acrylate benzyl chloride quaternary salt.

At least one nitrogen-containing monofunctional monomer may be used in a proportion of 1.0% to 10.0% by mass, for example, 3.0% to 9.0% by mass or 5.0% to 8.0% by mass, relative to the total mass of the polymerizable monomers A. Using nitrogen-containing monofunctional monomers in such a proportion tends to improve the adhesion and anti-blocking property of the ink coating.

Examples of aromatic group-containing monofunctional monomers include, but are not limited to, phenoxyethyl (meth)acrylate, benzyl(meth)acrylate, alkoxylated 2-phenoxyethyl(meth)acrylate, ethoxylated nonylphenyl(meth)acrylate, alkoxylated nonylphenyl(meth)acrylate, EO-modified p-cumylphenol (meth)acrylate, and 2-hydroxy-3-phenoxypropyl (meth)acrylate.

At least one aromatic group-containing monofunctional monomer may be used in a proportion of 20% to 50% by mass, for example, 22% to 45% by mass or 25% to 40% by mass, relative to the total mass of the polymerizable monomers A. Using aromatic group-containing monofunctional monomers in such a proportion tends to improve the adhesion and anti-blocking property of the ink coating.

Examples of saturated aliphatic group-containing monofunctional monomers include, but are not limited to, alicyclic group-containing (meth)acrylates, such as isobornyl (meth)acrylate (IBXA), tert-butylcyclohexanol acrylate (TBCHA), and 1,4-dioxaspiro[4.5]dec-2-ylmethyl 2-(meth)acrylate; linear or branched aliphatic group-containing (meth)acrylates, such as isoamyl(meth)acrylate, stearyl (meth)acrylate, lauryl(meth)acrylate, octyl(meth)acrylate, decyl(meth)acrylate, isodecyl(meth)acrylate, isomyristyl (meth)acrylate, isostearyl(meth)acrylate, 2-hydroxybutyl (meth)acrylate, butoxyethyl(meth)acrylate, tetrahydrofurfuryl(meth)acrylate, 2-hydroxyethyl(meth)acrylate, and 2-hydroxypropyl (meth)acrylate; and lactone-modified flexible (meth)acrylates. The saturated aliphatic group-containing monofunctional monomers cited above are compounds not having any crosslinked condensed ring.

At least one saturated aliphatic group-containing monofunctional monomer may be used in a proportion of 5.0% to 40% by mass, for example, 10% to 30% by mass or 15% to 25% by mass, relative to the total mass of the polymerizable monomers A. Using saturated aliphatic group-containing monofunctional monomers in such a proportion tends to improve the adhesion and anti-blocking property of the ink coating.

Examples of monofunctional (meth)acrylates having a crosslinked condensed ring structure include dicyclopentenyl(meth)acrylate, dicyclopentenyloxyethyl(meth)acrylate, and dicyclopentanyl (meth)acrylate. The term crosslinked condensed ring structure refers to a structure including two or more cyclic structures that share sides on a one-to-one basis and in which two or more nonadjacent atoms of the same cyclic structure or different cyclic structures are crosslinked.

1.1.1.2. Multifunctional Monomers C

The amount of multifunctional monomers C used is 20% to 50% by mass relative to the total mass of the polymerizable monomers A and may be 25% to 47.5% by mass, for example, 30% to 45% by mass or 35% to 42.5% by mass. Multifunctional monomers C in a proportion of 50% by mass or less relative to the total mass of the polymerizable monomers A tends to increase the adhesion of the ink coating. Also, multifunctional monomers C in a proportion of 20% by mass or more relative to the total mass of the polymerizable monomers A tends to improve the anti-blocking property of the ink coating.

The multifunctional monomers C include vinyl group-containing (meth)acrylate C1 represented by the following general formula (I) and may optionally include multifunctional monomer C2 other than vinyl group-containing (meth)acrylate C1.

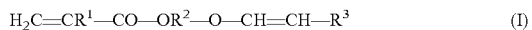

$$H_2C=CR^1-CO-OR^2-O-CH=CH-R^3 \quad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

In formula (I), the divalent organic residue with 2 to 20 carbon atoms represented by $R^2$ may be a substituted or unsubstituted linear, branched, or cyclic alkylene group with 2 to 20 carbon atoms, a substituted or unsubstituted alkylene group with 2 to 20 carbon atoms having an oxygen atom of an ether bond and/or an ester bond in the molecular structure thereof, or a substituted or unsubstituted divalent aromatic group with 6 to 11 carbon atoms. In some embodiments, $R^2$ is an alkylene group with 2 to 6 carbon atoms, such as ethylene, n-propylene, isopropylene, or butylene; or an alkylene group with 2 to 9 carbon atoms having an oxygen atom of an ether bond in the molecular structure, such as oxyethylene, oxy n-propylene, oxyisopropylene, or oxybutylene. In an embodiment, $R^2$ may be an alkylene group with 2 to 9 carbon atoms having an oxygen atom of an ether bond in the molecular structure, such as oxyethylene, oxy n-propylene, oxyisopropylene, or oxybutylene from the viewpoint of reducing the viscosity of the ink composition and further improving the curability of the ink composition.

In the above formula (I), the monovalent organic residue with 1 to 11 carbon atoms represented by $R^3$ may be a substituted or unsubstituted linear, branched, or cyclic alkyl group with 1 to 10 carbon atoms or a substituted or unsubstituted aromatic group with 6 to 11 carbon atoms. In some embodiments, $R^3$ is an alkyl group with 1 or 2 carbon atoms, that is, methyl or ethyl, or an aromatic group with 6 to 8 carbon atoms, such as phenyl or benzyl.

When the organic residues are substituted, the substituent may or may not contain one or more carbon atoms. For the substituent containing one or more carbon atoms, the carbon atoms of the substituent are counted in the number of carbon atoms of the organic residue. Examples of the substituent containing one or more carbon atoms include, but are not limited to, carboxy and alkoxy. Examples of the substituent not containing carbon atoms include, but are not limited to, hydroxy and halogens.

Specific examples of the compound of formula (I) include, but are not limited to, 2-vinyloxyethyl(meth)acrylate, 3-vinyloxypropyl(meth)acrylate, 1-methyl vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl (meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(2-vinyloxyethoxy)ethyl acrylate (VEEA), 2-(2-vinyloxyethoxy)ethyl methacrylate, 2-(vinyloxyisopropoxy)ethyl(meth)acrylate, 2-(vinyloxyethoxy) propyl(meth)acrylate, 2-(vinyloxyethoxy) isopropyl(meth)acrylate, 2-(vinyloxyisopropoxy) propyl(meth)acrylate, 2-(vinyloxyisopropoxy) isopropyl(meth)acrylate, 2-(vinyloxyethoxyethoxy)ethyl (meth)acrylate, 2-(vinyloxyisopropoxy)ethyl(meth) acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy) propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy) isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxy)ethyl(meth)acrylate, polyethylene glycol monovinyl ether (meth)acrylate, and polypropylene glycol monovinyl ether (meth)acrylate. In some embodiments, 2-(2-vinyloxyethoxy)ethyl acrylate (VEEA) may be used from the viewpoint of easily balancing the curability and viscosity of the ink composition. Such multifunctional monomer C1 can reduce the viscosity of the ink composition even when the proportion of multifunctional monomers in the ink composition is increased.

Vinyl group-containing (meth)acrylate C1 may be used in a proportion of 1.0% to 50% by mass, for example, 15% to 45% by mass or 30% to 40% by mass, relative to the total mass of the polymerizable monomers A. Using vinyl group-containing (meth)acrylate C1 in such a proportion tends to improve the adhesion and anti-blocking property of the ink coating and reduce the viscosity of the ink composition.

The multifunctional monomers C may include multifunctional monomer C2 other than the vinyl group-containing (meth)acrylate C1. When such multifunctional monomer C2 is contained, the multifunctional monomer C2 content of the ink composition is 10% by mass or less, for example, 5.0% by mass or less or 3.0% by mass or less, relative to the total mass of the ink composition. The lower limit of the multifunctional monomer C2 content of the ink composition may be 0% by mass. When the multifunctional monomer C2 content is in such a range, the viscosity of the ink composition is less likely to increase even when the proportion of multifunctional monomers in the ink composition is increased.

The multifunctional monomer C2 may be, but is not limited to, a multifunctional monomer other than vinyl ether group-containing (meth)acrylates, and examples include bifunctional (meth)acrylates, such as dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol dimethacrylate, tripropylene glycol di(meth)acrylate, polypropylene glycol di(meth)acrylate, 1,4-butanediol di(meth)acrylate, 1,6-hexanediol di(meth)acrylate (HDDA), 1,9-nonanediol di(meth)acrylate, neopentyl glycol di(meth)acrylate, dimethylol-tricyclodecane di(meth)acrylate, bisphenol A ethylene oxide (EO) adduct di(meth)acrylate, bisphenol A propylene oxide (PO) adduct di(meth)acrylate, hydroxypivalic acid neopentyl glycol di(meth)acrylate, and polytetramethylene glycol di(meth)acrylate; and trifunctional or more multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glyceryl propoxy tri(meth)acrylate, caprolactam-modified trimethylolpropane tri(meth)acrylate, pentaerythritolethoxy tetra(meth)acrylate, and caprolactam-modified dipentaerythritol hexa(meth)acrylate.

1.1.2. Definition of Homopolymers by Glass Transition Temperature

Polymerizable monomers A1, A2, and A3 of the polymerizable monomers A will now be described in detail in terms of the glass transition temperature of the homopolymer. The glass transition temperature of the homopolymer of each polymerizable monomer can be obtained from the safety data sheet (SDS) or catalog information of the polymerizable monomer.

In the embodiments of the present disclosure, the weighted average glass transition temperature of the homopolymers of the polymerizable monomers A, which is weighted by the proportions by mass of the individual polymerizable monomers A, is 25° C. to 40° C. and may be, in some embodiments, 27.5° C. to 37.5° C. or 30° C. to 35° C. When the weighted average glass transition temperature of the homopolymers is in such a range, the rub resistance of the ink coating tends to be increased.

The weighted average glass transition temperature of the homopolymers can be controlled by the glass transition temperatures of the homopolymers of the individual polymerization monomers A and the proportions by mass of the polymerizable monomers A.

It will now be explained how to calculate the weighted average glass transition temperature of the homopolymers of polymerizable monomers. The weighted average glass transition temperature of the homopolymers is represented by $Tg_{All}$; the glass transition temperature of a polymerizable monomer is represented by $Tg_N$, and the proportion by mass of the polymerizable monomer is represented by $X_N$ (% by mass). N is a variable from 1 to the number of polymerizable monomers in the ink composition, assigned in turn. For example, when three polymerizable monomers are used, the glass transition temperatures of their homopolymers are $Tg_1$, $Tg_2$, and $Tg_3$. The weighted average glass transition temperature $Tg_{All}$ of homopolymers is the sum of the products of the glass transition temperature $Tg_N$ of the homopolymer of each polymerizable monomer and the proportion $X_N$ by mass of the polymerizable monomer. Thus, the following equation (2) holds.

$$Tg_{All} = \Sigma Tg_N \times X_N \quad (2)$$

The glass transition temperature of the homopolymer of a polymerizable monomer can be measured by differential scanning calorimetry (DSC) in accordance with JIS K7121. More specifically, a sample prepared by polymerizing a polymerizable monomer to the extent that its homopolymer exhibits a constant glass transition temperature is measured with a measurement apparatus, for example, Model DSC6220 manufactured by Seiko Instruments Inc.

1.1.2.1. Polymerizable Monomer A1

Polymerizable monomer A1 is a polymerizable monomer whose homopolymer has a glass transition temperature of 50° C. or more. At least one polymerizable monomer A1 is used in a proportion of 20% to 50% by mass relative to the total mass of the polymerizable monomers A and, in some embodiments, in a proportion of 22.5% to 40% by mass or 25% to 30% by mass. Using at least one polymerizable monomer A1 in such a proportion tends to increase the rub resistance of the ink coating. Additionally, the weighted average glass transition temperature of the homopolymers of the polymerizable monomers A can be controlled in the range of 25° C. to 40° C. even when the polymerizable monomers A include later-described polymerizable monomer A2, whose homopolymer has a glass transition temperature of −20° C. or less, in a certain proportion.

The polymerizable monomers A1 may include polymerizable monomer A11 whose homopolymer has a glass transition temperature of 90° C. or more and, in some embodiments, may include isobornyl acrylate (IBXA, whose homopolymer has a glass transition temperature of 94° C.) belonging to the above-described group of monofunctional monomers B. The polymerizable monomer A11 content may be 10% to 50% by mass, for example, 15% to 40% by mass or 20% to 30% by mass, relative to the total mass of the polymerizable monomers A. Also, the isobornyl acrylate content may be 5.0% to 40% by mass, for example, 10% to 30% by mass or 15% to 25% by mass, relative to the total mass of the polymerizable monomers A. When the polymerizable monomers A1 include polymerizable monomer A11 whose homopolymer has a glass transition temperature of 90° C. or more, the ink coating tends to exhibit increased rub resistance. Also, when the polymerizable monomers A1 includes isobornyl acrylate, not only the ink coating exhibits increased rub resistance, but also the viscosity of the ink composition tends to decrease because isobornyl acrylate has appropriately bulky molecular structure.

1.1.2.2. Polymerizable Monomer A2

Polymerizable monomer A2 is a monomer whose homopolymer has a glass transition temperature of less than −20° C. Polymerizable monomers A2 may include a polymerizable monomer whose homopolymer has a glass transition temperature of −30° C. to less than −20° C. In some embodiments, polymerizable monomers A2 include phenoxyethyl acrylate (PEA, whose homopolymer has a glass transition temperature of −22° C.), which belongs to the above-described group of monofunctional monomers B. Such polymerizable monomer A2 tends to facilitate the control of the glass transition temperatures of the homopolymers of the polymerizable monomers A in a specific range. In particular, phenoxy acrylate tends to increase the solubility of the polymerization initiator and facilitate the control of the curability of the ink composition, as well as the control of the glass transition temperatures of homopolymers.

The polymerizable monomer A2 content may be 25% to 50% by mass, for example, 30% to 45% by mass or 35% to 40% by mass, relative to the total mass of the polymerizable monomers A. Such a polymerizable monomer A2 content enables the glass transition temperatures of the homopolymers of the polymerizable monomers A to be controlled in a specific range and tends to improve and balance the adhesion and anti-blocking property of the ink coating.

1.1.2.3. Polymerizable Monomer A3

Polymerizable monomer A3 is a monomer whose homopolymer has a glass transition temperature of −20° C. to less than 30° C. When the polymerizable monomers A include polymerizable monomer A3, the polymerizable monomer A3 content may be less than 40% by mass, for example, less than 20% by mass or less than 10% by mass, relative to the total mass of the polymerizable monomers A, and, in some embodiments, may be less than 5.0% by mass. The lower limit of polymerizable monomer A3 content may be 0% by mass. When the proportion of polymerizable monomer A3 is less than 40% by mass, the polymerizable monomers A tend to improve and balance the adhesion and anti-blocking property of the ink coating.

1.2. Coloring Material

The ink composition disclosed herein may further contain a coloring material. The ink composition containing a coloring material can be used as a colored ink composition. The coloring material may be at least either a pigment or a dye.

The total coloring material content may be 1.0% to 20% by mass, for example, 2.0% to 15% by mass or 2.0% to 10% by mass, relative to the total mass of the ink composition. The ink composition disclosed herein may contain no coloring material or a small amount (e.g., 0.1% by mass or less) of a coloring material to the extent that the coloring material is not intended for coloring.

Using a pigment tends as the coloring material tends to increase the light resistance of the ink composition. The pigment may be an inorganic pigment or an organic pigment. A pigment may be used independently, or two or more pigments may be used in combination.

Examples of the inorganic pigment include carbon black (C.I. (Color Index Generic Name) Pigment Black 7), such as furnace black, lamp black, acetylene black, and channel black; and iron oxide and titanium oxide.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

1.3. Polymerization Initiator

The ink composition disclosed herein may further contain a polymerization initiator. Known polymerization initiators include, but are not limited to, acylphosphine oxide-based polymerization initiators, alkylphenone-based polymerization initiators, titanocene-based polymerization initiators, and thioxanthone-based polymerization initiators. In some embodiments, acylphosphine oxide-based photopolymerization initiators are used. Such a polymerization initiator tends to increase the curability of the ink composition and, particularly, increase the curability in a curing process using an ultraviolet light emitting diode (UV-LED).

Exemplary acylphosphine oxide-based polymerization initiators include, but are not limited to, 2,4,6-trimethylbenzoyldiphenylphosphine oxide, bis(2,4,6-trimethylbenzoyl) phenylphosphine oxide, and bis(2,6-dimethoxybenzoyl)-2,4,4-trimethylpentylphosphine oxide.

The polymerization initiator content may be 1.0% to 20% by mass, for example, 3.0% to 15% by mass or 5.0% to 10% by mass, relative to the total mass of the ink composition. In some embodiments, the polymerization initiator of the ink composition is 7.0% to 9.0% by mass. When the polymerization initiator content is in such a range, the polymerization initiator is likely to dissolve in the ink composition, and the curability of the ink coating tends to increase.

1.4. Polymerization Inhibitor

The ink composition disclosed herein may further contain a polymerization inhibitor. A polymerization inhibitor may be used independently, or two or more polymerization inhibitors may be used in combination.

Examples of the polymerization inhibitor include, but are not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The polymerization inhibitor content may be 0.05% to 1.0% by mass, for example, 0.05% to 0.5% by mass, relative to the total mass of the ink composition.

1.5. Slipping Agent

The ink composition disclosed herein may further contain a slipping agent. A slipping agent may be used independently, or two or more slipping agents may be used in combination.

The slipping agent may be a silicone surfactant. In some embodiments, a polyester-modified silicone or a polyether-modified silicone is used. Examples of the polyether-modified silicone include BYK-378, BYK-3455, BYK-UV 3500, BYK-UV 3510, and BYK-UV 3530 (all produced by BYK Additives & Instruments). The polyester-modified silicone may be BYK-3570 (produced by BYK Additives & Instruments).

The slipping agent content may be 0.01% to 2.0% by mass, for example, 0.05% to 1.0% by mass, relative to the total mass of the ink composition.

1.6. Dispersant

The ink composition may further contain a dispersant. The dispersant may be, but is not limited to, a polymer dispersant or some other dispersant conventionally used for preparing pigment dispersion liquids. In an embodiment, the dispersant may contain mainly at least one polymer of polyoxyalkylene polyalkylene polyamine, vinyl polymers and copolymers, acrylic polymers and copolymers, polyester, polyamide, polyimide, polyurethane, amino polymers, silicon-containing polymers, sulfur-containing polymers, fluorine-containing polymers, and epoxy resin. A dispersant may be used independently, or two or more dispersants may be used in combination.

Commercially available polymer dispersants include AJISPER series produced by Ajinomoto Fine-Techno Co., Inc., Solsperse series, such as Solsperse 36000, available from Avecia or Noveon, Disper BYK series produced by BYK Additives & Instruments, and DISPARLON series produced by Kusumoto Chemicals, Ltd.

The dispersant content may be 0.1% to 5.0% by mass, for example, 0.3% to 3.0% by mass or 0.5% to 1.5% by mass, relative to the total mass of the ink composition.

1.7. Other Constituents

The ink composition disclosed herein may contain one or more constituents used in known ink jet ink compositions in addition to the above-described constituents. Examples of such other constituents include a surfactant, a penetration agent, a moisturizing agent, a solubilizing agent, a viscosity modifier, a pH adjuster, an antioxidant, a preservative, an antifungal agent, a corrosion inhibitor, a chelating agent for trapping metal ions affecting dispersion, other additives, and solvent. These constituents may be used individually or in combination.

2. Ink Jet Printing Method

The ink jet printing method disclosed herein includes an ink application step of ejecting the above-described radiation-curable ink jet ink composition onto a printing medium from an ink jet head, and an irradiation step of irradiating the radiation-curable ink jet ink composition on the printing medium with radiation. The way of ejection described above is also referred to as the ink jet method.

2.1. Ink Application Step

In the ink application step, a heated ink composition is ejected onto a printing medium from an ink jet head. More specifically, the ink composition in the pressure generating chamber of the ink jet head is ejected through nozzles by the operation of a pressure-generating device.

The ink jet head used in the ink application step may be a line head used for line printing or a serial head used for serial printing.

For line printing with a line head, for example, the ink jet head with a width more than or equal to the print width of the printing medium is fixed to an ink jet apparatus. While the printing medium is moved in a sub-scanning direction (longitudinal direction of the printing medium, medium transport direction), ink droplets are ejected through the nozzles of the ink jet head in conjunction with the movement of the printing medium, thus printing an image on the printing medium.

For serial printing with a serial head, an ink jet head is mounted on or in a carriage capable of moving across the width of the printing medium. While the carriage is moved in the main scanning direction (lateral or width direction of the printing medium), the head ejects ink droplets through the nozzles, thus printing an image on the printing medium.

2.2. Irradiation Step

In the irradiation step, the ink composition on the printing medium is irradiated with radiation. On irradiating the ink composition with radiation, the polymerizable monomers start polymerization to cure the ink composition, thus forming an ink coating. When a polymerization initiator is present at this time, the polymerization initiator produces active species (initiation species), such as radicals, an acid, and a base. The initiation species promote the polymerization reaction of the monomers. Additionally, in the presence of a photosensitizer, the photosensitizer absorbs radiation to be excited. The excited photosensitizer comes into contact with the polymerization initiator to promote the decomposition of the polymerization initiator, thus further promoting the curing reaction.

The radiation used herein may be ultraviolet light, infrared light, visible light, or X rays. The radiation is applied to the ink composition from a radiation source disposed downstream of the ink jet head. The radiation source may be, but is not limited to, an ultraviolet light emitting diode. Use of such a radiation source can reduce the size and cost of the apparatus. The ultraviolet light emitting diode used as the radiation source, which is small, can be incorporated into the ink jet apparatus.

For example, the ultraviolet light emitting diode may be attached to the carriage (on both ends of the carriage in the direction parallel to the width of the printing medium and/or on the medium transport direction side of the carriage) on which the ink jet head to eject the ink composition is mounted. Additionally, the ultraviolet light emitting diode can rapidly cure the ink composition at low energy, depending on the constituents and their contents of the ink composition.

3. Ink Jet Apparatus

The ink jet apparatus used in an embodiment of the present disclosure includes an ink jet head having nozzles through which an ink composition is ejected and a pressure chamber into which the ink composition is fed, and a radiation source to apply radiation to the ink composition. The ink jet apparatus uses the above-described ink composition as the ink composition.

The FIG. 1s a perspective view of a serial printer as an example of the ink jet apparatus. As depicted in the FIGURE, the serial printer 20 includes a transport section 220 and a printing section 230. The transport section 220 transports a printing medium F fed to the serial printer to the printing section 230 and, after printing, ejects the printing medium outside the serial printer. More specifically, the transport section 220 includes feed rollers that transport the printing medium F fed thereto in the sub-scanning direction T1.

The printing section 230 includes an ink jet head 231 that ejects a radiation-curable ink jet ink composition onto the printing medium F fed from the transport section 220, a radiation source 232 that applies radiation to the radiation-curable ink jet ink composition on the printing medium, a carriage 234 equipped with the ink jet head 231 and the radiation source 232, and a carriage transfer mechanism 235 that transfers the carriage 234 in the main scanning directions S1 and S2 in which the printing medium F is scanned.

In the embodiment illustrated in the FIGURE, the carriage holds the radiation source. However, another type of radiation source not held by the carriage may be used.

Also, the ink jet printing apparatus may be a serial printer or a line printer.

4. Printing Medium

Exemplary materials of the printing medium include, but are not limited to, plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinyl acetal; and glass, paper, metal, and wood. Plastic printing media may be surface-treated.

ACMO (acryloylmorpholine, produced by KJ Chemicals Corporation)

Multifunctional Monomers:

VEEA (2-(2-vinyloxyethoxy)ethyl acrylate, produced by Nippon Shokubai Co., Ltd.)

DPGDA (dipropylene glycol diacrylate, available as SR508 (product name) produced by Sartomer)

Polymerization Initiators:

Irg. 819 (bis(2,4,6-trimethylbenzoyl)phenylphosphine oxide, available as IRGACURE 819 (product name) produced by BASF)

TPO (2,4,6-trimethylbenzoyldiphenylphosphine oxide available as IRGACURE TPO (product name) produced by BASF) Polymerization Inhibitor:

MEHQ (hydroquinone monomethyl ether, available as p-Methoxyphenol (product name) produced by Kanto Chemical Co., Inc.)

EXAMPLES

The subject matter of the present disclosure will be further described in detail with reference to Examples and Comparative Examples. However, the implementation of the concept of the present disclosure is not limited to the following Examples.

1. Preparation of Ink Compositions

Constituents for the individual compositions presented in the Table were placed into a mixing tank, followed by mixing and stirring, and the mixture was filtered through a membrane filter with a pore size of 5 μm. Thus, the compositions of the Examples were prepared. The values of the constituents in the Table are expressed by mass percent unless otherwise specified.

TABLE

|  |  |  | Tg (° C.)[*1] | Example |  |  |  |  | Comparative Example |  |  |  |  |  |
|---|---|---|---|---|---|---|---|---|---|---|---|---|---|---|
|  |  |  |  | 1 | 2 | 3 | 4 | 5 | 1 | 2 | 3 | 4 | 5 | 6 |
| Polymer-izable monomer A | Mono-functional monomer B | IBXA | 94 | 16.0 | 24.0 | 13.0 | 19.0 | 11.0 | 20.0 | 10.0 | 19.0 | 5.0 | 21.0 | 11.0 |
|  |  | PEA | −22 | 31.3 | 38.3 | 28.3 | 28.3 | 36.3 | 44.3 | 27.3 | 23.3 | 42.3 | 48.3 | 31.3 |
|  |  | ACMO | 145 | 5.0 | 5.0 | 5.0 | 5.0 | 5.0 | 10.0 | 5.0 | 10.0 | 5.0 | 5.0 | 2.0 |
|  | Multi-functional monomer C | VEEA | 39 | 32.0 | 17.0 | 38.0 | 32.0 | 32.0 | 10.0 | 40.0 | 32.0 | 32.0 | 0.0 | 43.0 |
|  |  | DPGDA | 62 | 3.0 | 3.0 | 3.0 | 3.0 | 3.0 | 3.0 | 5.0 | 3.0 | 3.0 | 13.0 |  |
| Polymerization initiator |  | Irg.819 |  | 2.5 | 2.5 | 2.5 | 2.5 | 2.5 | 2.5 | 2.5 | 2.5 | 2.5 | 2.5 | 2.5 |
|  |  | TPO |  | 5.5 | 5.5 | 5.5 | 5.5 | 5.5 | 5.5 | 5.5 | 5.5 | 5.5 | 5.5 | 5.5 |
| Polymerization inhibitor |  | MEHQ |  | 0.2 | 0.2 | 0.2 | 0.2 | 0.2 | 0.2 | 0.2 | 0.2 | 0.2 | 0.2 | 0.2 |
| Slipping agent |  | BYK-UV3500 |  | 0.5 | 0.5 | 0.5 | 0.5 | 0.5 | 0.5 | 0.5 | 0.5 | 0.5 | 0.5 | 0.5 |
| Coloring material |  | Carbon black |  | 3.0 | 3.0 | 3.0 | 3.0 | 3.0 | 3.0 | 3.0 | 3.0 | 3.0 | 3.0 | 3.0 |
| Dispersant |  | Solsperse36000 |  | 1.0 | 1.0 | 1.0 | 1.0 | 1.0 | 1.0 | 1.0 | 1.0 | 1.0 | 1.0 | 1.0 |
|  |  | Total |  | 100.0 | 100.0 | 100.0 | 100.0 | 100.0 | 100.0 | 100.0 | 100.0 | 100.0 | 100.0 | 100.0 |
| Physical property |  | Proportion (wt %) of monofunctional monomer B to total of polymerizable monomers A |  | 60 | 77 | 53 | 60 | 60 | 85 | 48 | 60 | 60 | 85 | 51 |
|  |  | Proportion (wt %) of polymerizable monomer A1 to total of polymerizable monomers A |  | 27 | 37 | 24 | 31 | 22 | 38 | 23 | 37 | 15 | 45 | 15 |
|  |  | Weighted average glass transition temperature (° C.) of homopolymers of polymerizable monomers A |  | 34 | 34 | 34 | 38 | 27 | 34 | 34 | 48 | 19 | 28 | 26 |
| Evaluation |  | Anti-blocking property |  | A | B | A | A | A | C | A | A | A | C | B |
|  |  | Adhesion |  | A | A | B | B | A | A | C | C | A | A | C |
|  |  | Rub resistance |  | A | B | A | A | B | B | A | A | C | B | A |

The abbreviations and materials of the constituents in the Table are as follows.

Monofunctional Monomers:

IBXA (isobornyl acrylate, produced by Osaka Organic Chemical Industry Ltd.)

PEA (phenoxyethyl acrylate, available as Biscoat #192 (product name) produced by Osaka Organic Chemical Industry Ltd.)

Slipping Agent:

BYK-UV 3500 (polyether-modified, acryloyl group-containing polydimethylsiloxane produced by BYK Additives & Instruments)

Coloring Material:

Carbon black (MA-100 (product name) produced by Mitsubishi Chemical Corporation)

Dispersant:

Solsperse 36000 (polymer dispersant produced by Lubrizol Corporation)

2. Evaluation
2.1. Evaluation of Anti-Blocking Property

Each radiation-curable ink jet ink composition was applied onto a polyvinyl chloride film that is a printing medium to a thickness of 10 μm with a bar coater and irradiated with ultraviolet light at a radiation intensity of 200 mJ/cm$^2$ in terms of cumulative energy. The light source was an LED having a peak wavelength at 395 nm. The resulting prints were put one on top of another, with the rear side of the printing medium on the printed side having an ink coating of another print, and the prints in this state were allowed to stand in an environment of 20° C. to 25° C. and a humidity of 40% RH to 60% RH for 24 hours while a load of 500 g/cm$^2$ was applied. After being allowed to stand, the prints were visually checked for peeling of ink coatings from the prints and transfer of the ink coatings to the rear side, and the anti-blocking property was evaluated according to the following criteria.

Criteria
- A: No peeling of ink coatings was observed, and no ink coating was transferred despite putting the prints on top of another.
- B: No peeling of ink coatings was observed, but ink coatings were slightly transferred when the prints were put on top of another.
- C: Ink coatings were peeled.

2.2. Evaluation of Adhesion

The ink coating formed in the same manner as in the anti-blocking property test was subjected to cross-cut test in accordance with JIS K5600-5-6. More specifically, the blade of a box cutter was perpendicularly put on the ink coating, and, thus, a 10×10 grid was formed with cut lines spaced 1 mm apart. A 25 mm-wide transparent adhesive tape of about 75 mm in length was stuck over the grid and sufficiently rubbed with a finger so that the ink coating could be seen through the tape. Then, within 5 minutes after sticking the tape, the tape was pulled off the ink coating reliably in 0.5 s to 1.0 s at an angle of about 60°, and the grid was visually observed (cut peeling).

Also, the transparent adhesive tape was stuck over the ink coating not subjected to cuts with a box cutter. Then, the tape was similarly pulled off the ink coating reliably in 0.5 s to 1.0 s at an angle of about 60° within 5 minutes after being stuck, and the ink coating was visually observed (tape peeling). The adhesion was evaluated from the results of the cut peeling and the tape peeling according to the following criteria.

Criteria
- A: No peeling was observed in both the cut peeling and the tape peeling.
- B: Peeling was observed in the cut peeling but not in the tape peeling.
- C: Peeling was observed in both the cut peeling and the tape peeling.

2.3. Evaluation of Rub Resistance

The ink coating formed in the same manner as in the anti-blocking property test was rubbed reciprocally 20 times or until the ink coating was peeled, with a rubber, with a white cotton cloth (according to JIS L 0803) attached, of a Gakushin-type rubbing tester AB-301 (manufactured by Tester Sangyo Co., Ltd.) at a load of 200 g. The degree of peeling of the ink coating from the printing medium was visually observed, and rub resistance was evaluated according to the following criteria.

Criteria
- A: No abrasion was observed in the ink coating, and no stain of the ink composition was not observed on the white cotton cloth.
- B: Abrasion in the ink coating or a stain of the ink composition on the white cotton cloth was observed.
- C: Abrasion in the ink coating and a stain of the ink composition on the white cotton cloth were observed.

3. Evaluation Results

Comparison between Examples 1 to 5 according to the present disclosure and Comparative Examples 1 to 6, which do not satisfy the requirements of the ink composition of the present disclosure, showed that the ink coatings of the Examples were superior to those of Comparative Examples 1 to 6 in anti-blocking property, adhesion, and rub resistance.

What is claimed is:

1. A radiation-curable ink jet ink composition, comprising:
polymerizable monomers A including at least one monofunctional monomer B and at least one multifunctional monomer C,
the polymerizable monomers A including at least one polymerizable monomer A1 whose homopolymer has a glass transition temperature of 50° C. or more in a proportion of 20% by mass or more relative to the total mass of the polymerizable monomers A,
homopolymers of the polymerizable monomers A having glass transition temperatures $Tg_{All}$ whose average weighted by the proportions by mass of the individual polymerizable monomers A is 25° C. to 40° C.,
the glass transition temperatures whose average weighted by the proportions by mass of the individual polymerizable monomers A is calculated by equation (1),

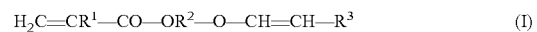

$Tg_{All}=\Sigma Tg_N \times X_N$ (1), where $Tg_N$ represents the glass transition temperature of a polymerizable monomer, and $X_X$ represents the proportion by mass of the polymerizable monomer, the at least one monofunctional monomer B being contained in a proportion of 50% to 80% by mass relative to the total mass of the polymerizable monomers A,
the at least one multifunctional monomer C including vinyl group-containing (meth)acrylate C1 represented by the following general formula (I):

$$H_2C=CR^1-CO-OR^2-O-CH=CH-R^3 \qquad (I)$$

wherein $R^1$ represents a hydrogen atom or a methyl group, $R^2$ represents a divalent organic residue with 2 to 20 carbon atoms, and $R^3$ represents a hydrogen atom or a monovalent organic residue with 1 to 11 carbon atoms.

2. The radiation-curable ink jet ink composition according to claim 1, wherein
the polymerizable monomers A include polymerizable monomer A2 whose homopolymer has a glass transition temperature of less than −20° C.

3. The radiation-curable ink jet ink composition according to claim 1, wherein
the at least one polymerizable monomer A1 includes at least one polymerizable monomer A11 whose homopolymer has a glass transition temperature of 90° C. or more in a proportion of 20% by mass or more relative to the total mass of the polymerizable monomers A.

4. The radiation-curable ink jet ink composition according to claim 1, wherein
the at least one polymerizable monomer A1 includes isobornyl acrylate.

5. The radiation-curable ink jet ink composition according to claim 1, wherein
the polymerizable monomers A optionally include polymerizable monomer A3 whose homopolymer has a glass transition temperature of −20° C. to less than 30° C. in a proportion of less than 40% by mass relative to the total mass of the polymerizable monomers A.

6. The radiation-curable ink jet ink composition according to claim 1, wherein
the at least one multifunctional monomer C optionally includes multifunctional monomer C2 other than the vinyl group-containing (meth)acrylate C1 in a proportion of 10% by mass or less relative to the total mass of the ink composition.

7. An ink jet printing method comprising:
an ink application step of ejecting the radiation-curable ink jet ink composition as set forth in claim 1 onto a printing medium from an ink jet head; and
an irradiation step of irradiating the radiation-curable ink jet ink composition on the printing medium with radiation.

* * * * *